June 1, 1943.  C. T. ASHBY  2,320,500
REFRIGERATION
Filed Nov. 2, 1939   7 Sheets-Sheet 3

INVENTOR.
Carl T. Ashby
BY
his ATTORNEY.

June 1, 1943.　　　C. T. ASHBY　　　2,320,500
REFRIGERATION
Filed Nov. 2, 1939　　　7 Sheets-Sheet 4

INVENTOR.
Carl T. Ashby
BY Ell Fenander
his ATTORNEY.

June 1, 1943. C. T. ASHBY 2,320,500
REFRIGERATION
Filed Nov. 2, 1939 7 Sheets-Sheet 5

INVENTOR.
Carl T. Ashby
BY
his ATTORNEY.

June 1, 1943. C. T. ASHBY 2,320,500
REFRIGERATION
Filed Nov. 2, 1939 7 Sheets-Sheet 7

INVENTOR.
Carl T. Ashby
BY
his ATTORNEY.

Patented June 1, 1943

2,320,500

UNITED STATES PATENT OFFICE

2,320,500

REFRIGERATION

Carl T. Ashby, Evansville, Ind., assignor to Servel, Inc., New York, N. Y., a corporation of Delaware Application November 2, 1939, Serial No. 302,503

13 Claims. (Cl. 62—126)

This invention relates to refrigeration, and more particularly to cooling units or evaporators for refrigeration apparatus.

It is an object of the invention to provide an improved cooling unit or evaporator which is efficient in operation and also readily fabricated. I accomplish this by providing a shell having ribs which are bent about and in good thermal contact with straight portions of a looped coil in which refrigerant evaporates to produce a refrigerating effect. The shell may be formed in a single piece or a plurality of sections, and, in order to facilitate the fabrication of the cooling unit and provide for rapid withdrawal of heat from the shelves to the looped coil, the sections are preferably H-shaped with each section having integrally formed parts serving as portions of the shelf walls and the side walls. In order to facilitate the fabrication of the cooling unit, the shell with the ribs thereon and the looped coil are formed in such a manner that the shell and looped coil can be placed in alignment and moved relatively to each other with grooves or channels formed by the ribs receiving the straight portions of the looped coil without interference by the connecting bends. After the shell and looped coil are assembled, the ribs are bent about the straight portions of the looped coil to complete the fabrication of the cooling unit or evaporator.

The invention, together with the above and other objects and advantages thereof, will become apparent from the following description taken in conjunction with the accompanying drawings, and of which.

Figures 1, 2:
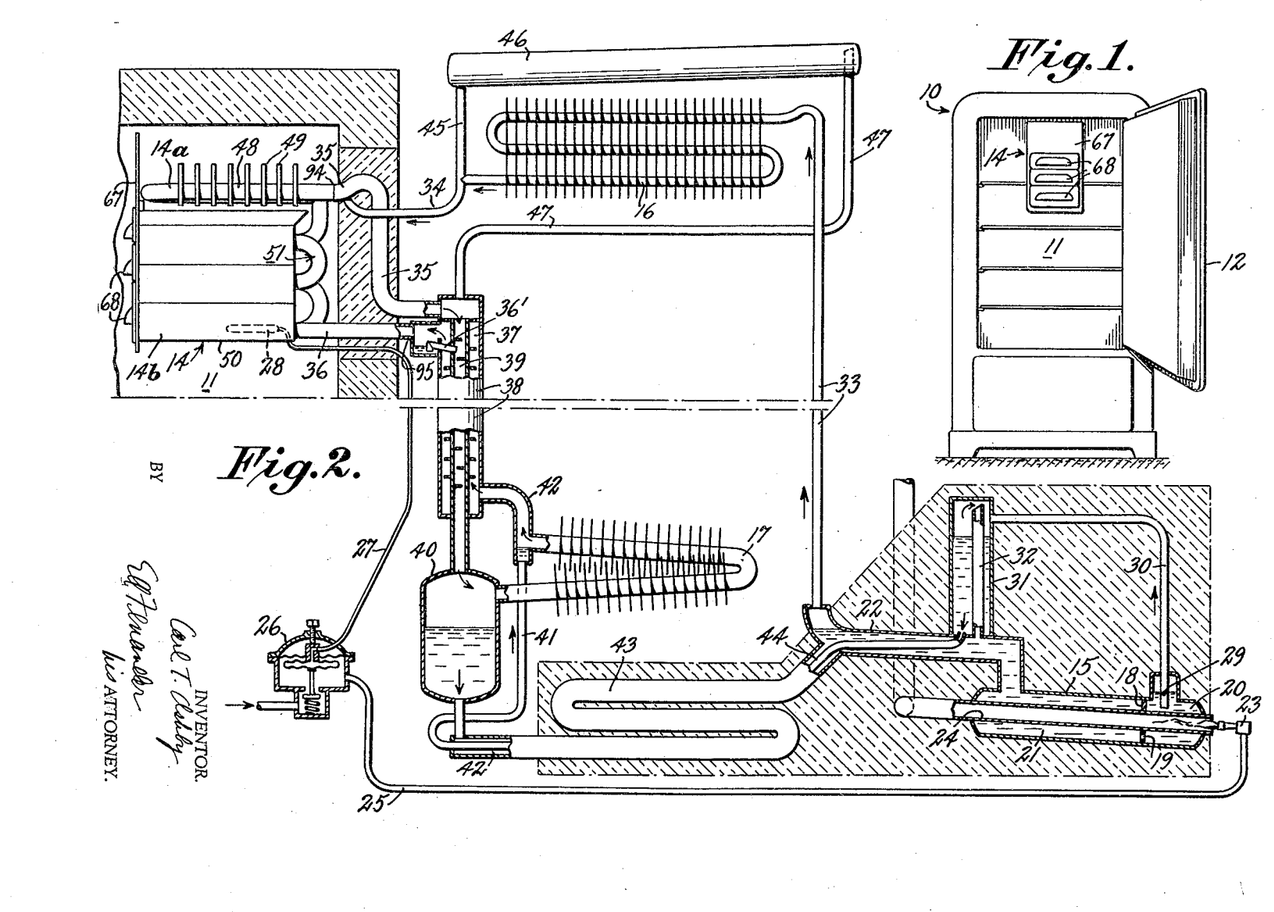
Fig. 1 is a front elevation of a refrigerator provided with a cooling unit or evaporator embodying the invention.
Fig. 2 more or less diagrammatically illustrates refrigeration apparatus with which the cooling unit or evaporator in Fig. 1 is associated.

Referring to Fig. 1, I have shown a refrigerator comprising a cabinet 10 having a thermally insulated storage compartment 11 into which access may be had by door 12 hinged to the front of the cabinet. Within the storage compartment 11 is arranged my improved cooling unit 14 for producing cold to freeze ice cubes and the like and maintain the storage compartment 11 at a desired low temperature.

In Fig. 2 I have shown the cooling unit or evaporator 14 in connection with refrigeration apparatus of a uniform pressure absorption type containing a pressure equalizing gas and like that described in Patent No. 2,164,045 granted June 27, 1939 to Ullstrand and Thomas. A system of this type includes the cooling unit 14, a generator 15, condenser 16 and an absorber 17 which are interconnected in a manner fully described in the aforesaid patent and which will briefly be described hereinafter. The system contains a solution of refrigerant in absorption liquid, such as ammonia in water, for example, and also an auxiliary agent or inert gas, such as hydrogen.

The generator 15 is formed with a partition 18 having an opening 19 to provide communication between a forward chamber 20 and a rear chamber 21 which is connected to an analyzer vessel 22. The generator 15 may be heated in any suitable manner, as by gas burner 23, which projects its flame into the forward end of a horizontal flue 24 which extends through the generator. A suitable combustible gas is delivered from a source of supply through a conduit 25 to the burner 23 and the flow of gas to the latter may be controlled by control valve 26 which is connected by tube 27 to a thermal bulb 28 secured to and in thermal contact with cooling unit 14.

Heating of generator 15 causes refrigerant vapor and absorption liquid to pass through an opening 29 at the lower end of the conduit 30 which constitutes a liquid vapor lift and conducts refrigerant vapor and absorption liquid into the upper part of a stand pipe or separator 31. The liberated refrigerant vapor entering the stand pipe 31 flows downward through a vertical conduit 32 into the analyzer 22, and, together with refrigerant expelled from solution in the generator 15, flows upward through a conduit 33 to the air-cooled condenser 16. Refrigerant vapor is liquefied in the condenser 16 and flows through conduits 34 and 35 into the upper part of the cooling unit 14.

Inert gas enters the lower part of the cooling unit 14 through a conduit 36 from the outer passage 37 of a gas heat exchanger 38. Liquid refrigerant evaporates and diffuses into the inert gas with consequent absorption of heat from the cooling unit 14 and its surroundings. The resulting mixture of refrigerant and inert gas, that is, gas rich in refrigerant, flows downward from the upper part of the cooling unit 14 through conduit 35 and the inner passage 39 of the gas heat exchanger 38 which is connected at its lower end to the upper part of a vessel 40. The gas rich in refrigerant flows from the vessel 40 into the lower end of the absorber 17 which is air-cooled and in which the refrigerant is absorbed from the inert gas into downwardly flowing weak absorption liquid which enters through a conduit 41. The inert gas, which is practically insoluble and weak in refrigerant, flows upward from the absorber 17 through a conduit 42, the outer passage 37 of the gas heat exchanger 38 and conduit 36 into the lower part of the cooling unit 14.

Absorption liquid enriched in refrigerant flows from the lower part of absorber 17 into the vessel 40 and thence through an outer passage 42 of a liquid heat exchanger 43 and the analyzer 22 into chamber 21 of the generator 15. Liberated refrigerant vapor and absorption liquid are caused to flow upward through conduit 30 into the upper part of stand pipe 31 to a higher level than the upper end of the absorber 17, whereby absorption liquid weak in refrigerant flows by gravity from the stand pipe 31 through the inner passage or conduit 44 of liquid heat exchanger 42 and conduit 40 into the upper end of the absorber 17.

The lower end of the condenser 16 is connected by the conduit 45, vessel 46, and conduit 47 to the gas circuit, so that any inert gas which may pass through the condenser can flow to the gas circuit and not be trapped in the condenser. If refrigerant is not liquefied in the condenser due to an increase in air temperature, the refrigerant vapor will flow through conduit 45 to displace inert gas in the vessel 46 and force inert gas through conduit 47 into the gas circuit, thereby raising the total pressure in the system so that an adequate condensing pressure is obtained for the increased air temperature.

A drain conduit 36' is provided at the lower end of cooling unit 14 to permit unevaporated refrigerant to flow into the inner passage 39 of gas heat exchanger 38.

The evaporator or cooling unit 14 includes an upper part 14a and a lower part 14b. Since gas rich in refrigerant flows from the upper evaporator part 14a through conduit 35 while gas weak in refrigerant enters the lower evaporator part 14b through conduit 36, the gas in the upper evaporator part 14a contains a greater amount of refrigerant vapor than the gas in the lower evaporator part 14b.

Figure 3:
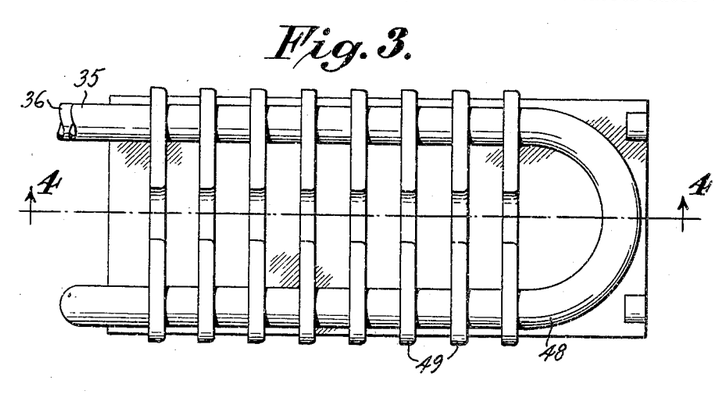
Fig. 3 is a top plan view of the cooling unit shown in Figs. 1 and 2.

Evaporator part 14a may be primarily employed for cooling the compartment 11 and, as shown most clearly in Fig. 3, comprises a pipe in the form of a U-shaped loop 48 having a plurality of heat dissipating elements or fins 49 fixed thereto to provide a relatively extensive heat transfer surface. The lower evaporator part 14b is employed as a freezing unit since evaporation of liquid refrigerant takes place at a lower temperature therein.

During operation of the system, refrigerant fluid, inert gas and absorption liquid circulate in the manner described above, whereby the evaporator parts 14a and 14b produce a refrigerating effect. The inert gas, such as hydrogen, circulates continuously in the gas circuit including evaporator 14 and absorber 17 by force developed within the system. This force to cause circulation of inert gas is due to the difference in specific weight of the columns of gas rich and weak in refrigerant, respectively, in the gas circuit.

In accordance with my invention the lower evaporator part 14b comprises a metallic shell or housing 50 and a looped coil or conduit 51 which are formed in such a manner that these parts can easily be assembled in interfitting relation and the shell thereafter secured in good thermal contact with the straight portions of the looped coil. The shell 50 may be formed from a number of sections each of which has integrally formed portions constituting parts of the spaced side walls and shelves of the lower evaporator part 14b, such sections interfitting in a suitable manner to provide the shell 50.

Figure 4:
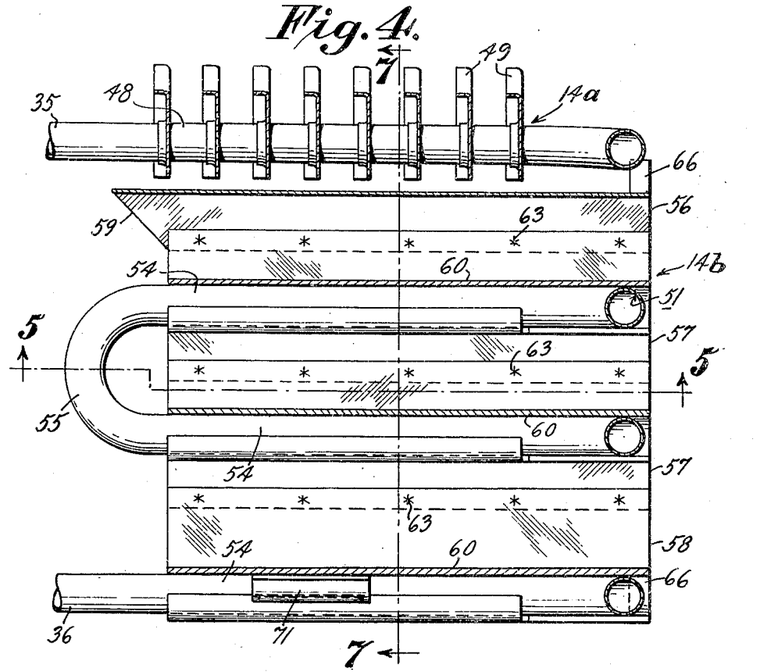
Fig. 4 is a vertical sectional view taken on lines 4—4 of Figs. 3 and 6, respectively.
Figure 5:
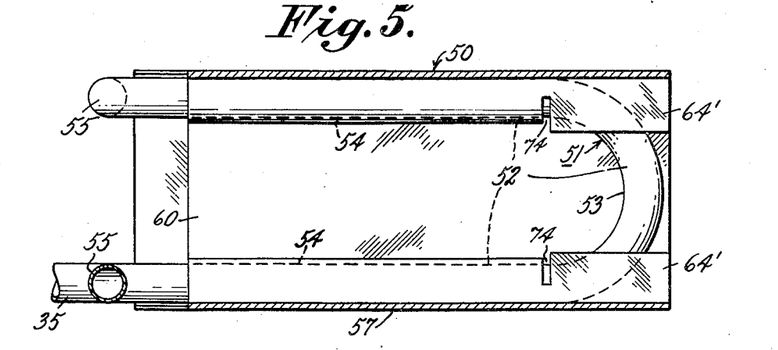
Fig. 5 is a horizontal sectional view taken on line 5—5 of Fig. 4.

The looped coil 51 is a continuation of the uppermost U-shaped loop 48 and is formed to provide a plurality of horizontally disposed U-shaped loops 52, one of which is shown in Fig. 5. The loops 52 are disposed one above the other with the closed ends 53 at the forward end of the cooling unit 14. The straight portions 54 extending rearwardly from the closed ends 53 are connected at their rear ends and also to the uppermost loop 48 by vertical conduit bends 55, as shown in Figs. 4, 6 and 7, to provide a continuous downward path of flow for liquid refrigerant entering the uppermost loop 48 through conduits 34 and 35.

The metallic shell 50 is formed of a plurality of sections including top section 56, similar intermediate sections 57 and a bottom section 58. The top section 55 is of inverted U-shape and open at both ends. The sides of the top section 56 are cut at an angle, as indicated at 59 in Fig. 4, so that the top of the shell 50 will extend rearwardly beyond the heat transfer fins 49 at the rear of the upper evaporator part 14a.

Figure 6:
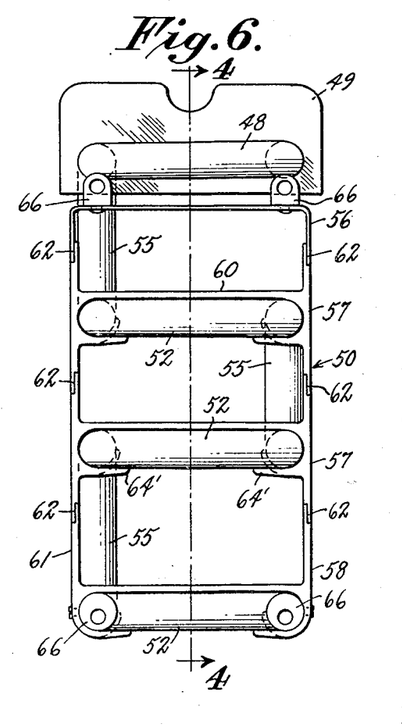
Fig. 6 is a front elevation of the cooling unit shown in Figs. 1 and 2 with the front baffle plate removed therefrom.
Figure 7:
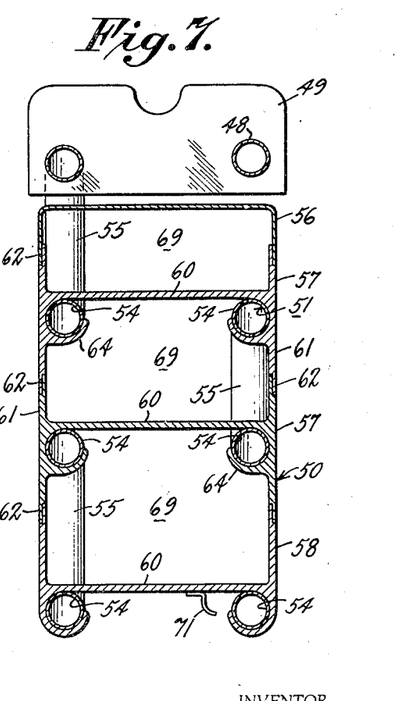
Fig. 7 is a vertical sectional view taken on line 7—7 of Fig. 4.

The intermediate and bottom sections 57 and 58 are also open ended and H-shaped, as shown most clearly in Figs. 6 and 7, the integrally formed horizontal portions and spaced vertical portions constituting the shelves 60 and portions of the side walls 61 of the shell 50. The intermediate sections 57 and bottom section 58 are notched or recessed along their edges, as indicated at 62 in Figs. 6 and 7, so that these sections and the top section 56 interfit to provide the shell 50 having smooth exterior surfaces. The sections 56, 57 and 58 may be secured together in any suitable manner, as by spot welding indicated at 63 in Fig. 4.

The straight portions 54 of the horizontally disposed U-shaped loops 52 are secured in position against the bottoms of the shelves 60 and the portions of the side walls 61 beneath the shelves. This is accomplished by providing the intermediate sections 57 and bottom section 58 with ribs 64 which are below the shelves 60 and spaced therefrom a distance substantially the same as the outer diameter of the pipe or conduit 51. The ribs 64 extend inwardly from the side walls 61 and taper slightly toward their outer ends. As shown most clearly in Figs. 4 and 7, the ribs 64 are bent upwardly and wrap around the pipe or conduit, whereby the straight portions 54 are caused to hug the grooves or channels formed by the shelves 60 and the ribs 64.

The front corners of the housing 50 are provided with small brackets 66 which are secured, as by riveting, for example, to the upper and lower sections 56 and 58, as shown most clearly in Fig. 6. These brackets are provided to secure a baffle plate 67 at the front of the cooling unit 14, whereby both the upper and lower parts 14a and 14b are concealed from view, as shown in Fig. 2. The baffle plate 67 is provided with a plurality of openings to permit the insertion and withdrawal of trays 68 into and from the compartments 69 within shell 50.

The evaporation and diffusion of refrigerant into the inert gas within the conduit 51 takes place with consequent absorption of heat from its surroundings, as explained above. When trays containing water to be frozen are positioned on the shelves 60, therefore, heat is removed from the bottom of the trays through the shelves 60 which are in thermal relation with looped coil 51.

A suitable clamp 71 may be secured to the bottom of the lowermost shelf 60, as shown in Fig. 7 to hold the thermal bulb 28 in position and in good thermal contact with the lower part of the cooling unit 14.

The method of fabricating the cooling unit 14 described above is substantially as follows: The pipe or conduit 51 is formed over suitable dies to provide the uppermost loop 48 and the U-shaped loops 52 one above the other. After the uppermost loop 48 is formed the fins 49 are fixed thereto. Several sections of piping or conduit are shaped over dies and then welded together to form the looped coil. As brought out above, the forward ends of the U-shaped loops 52 are closed by the connecting bends 53 and the rear ends of the straight portions 54 are connected by the vertical bends 55 to provide a continuous downward path of flow for liquid refrigerant, the successive vertical connecting bends 55 being at opposite sides of the straight portions 54, as shown most clearly in Figs. 6 and 7.

Figure 8:
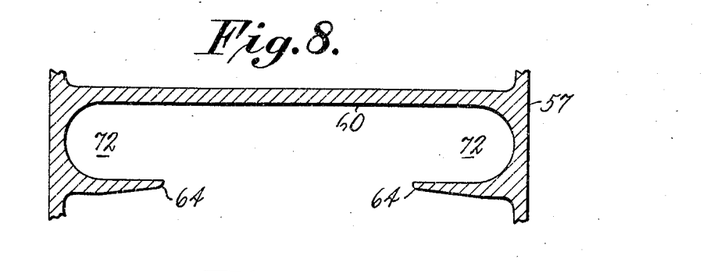
Fig. 8 is a fragmentary sectional view of an intermediate section of the cooling unit before assembly with the cooling coil.
Figure 9:
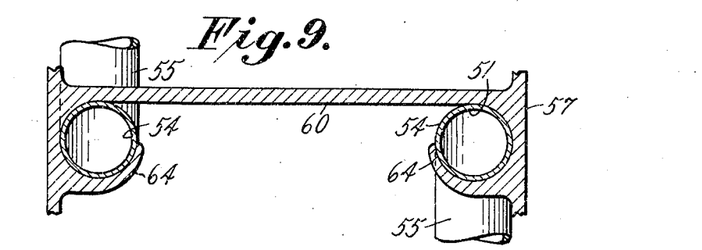
Fig. 9 is a fragmentary sectional view of an intermediate section of the cooling unit and the cooling coil after these parts are assembled and secured together in good thermal contact.

The intermediate and bottom sections 57 and 58 of shell 50 are formed with the ribs 64 substantially parallel to the shelf portion 60, as shown in Fig. 8. The top section 56, intermediate section 57 and bottom section 58 are secured together by welding, as indicated at 63 in Fig. 4, to form the shell 50. The looped coil and shell 50 are placed in alignment with the rear of the shell 50 adjacent to the front connecting bends 53 of the horizontal loops 52. The shell 50 and looped coil are then moved relatively to each other with the grooves or channels 72 formed by the shelves 60 and ribs 64 receiving the straight portions 54 of the loops 52. Since the vertical connecting bends 55 are at the rear of the looped coil, the channels 72 can receive the straight portions 54 without interference by the connecting bends.

After the shell 50 is moved rearwardly onto the looped coil to the position shown in Fig. 4, the ribs 64 are bent about the straight portions 54 with a suitable tool, whereby the straight portions are clamped and rigidly held in position by the ribs 64, as shown in Figs. 4 and 7.

With the looped coil and shell 59 assembled, the brackets 66 may be secured to the shell and the baffle 67 fixed to the brackets 66.

After the cooling unit 14 is fabricated, it is only necessary to make the necessary connections to other parts of the refrigeration system. As shown most clearly in Fig. 2, the cooling unit 14 when completed is connected at 94 to conduit 35 and at 95 to gas heat exchanger 38.

Figure 10:
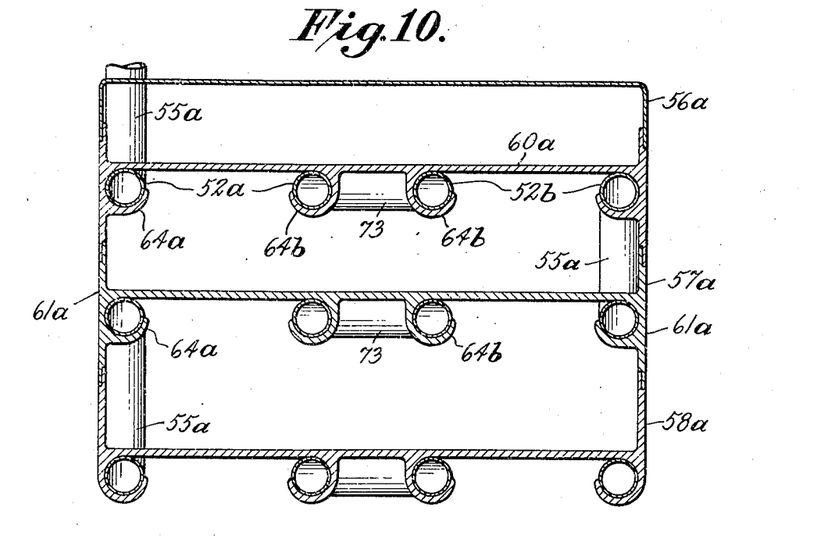
Fig. 10 is a sectional view similar to Fig. 7 illustrating a modification of the invention.

In Fig. 10 is illustrated a modification of the invention in which the conduit or pipe 51 is shaped to provide two groups of U-shaped loops 52a and 52b along side each other. Liquid refrigerant enters through the uppermost vertical connecting bend 55a and flows through the uppermost U-shaped loop 52a which is closed at its forward end in the same manner as in the embodiment described above and shown most clearly in Fig. 5. The right-hand rear end of loop 52a is connected by a connecting bend 73 to the uppermost U-shaped loop 52b, whereby liquid refrigerant flows through the latter and thence through the vertical connecting bend 55a from the rear of the uppermost loop 52b to the loop directly beneath it. Liquid refrigerant thence flows through the intermediate loop 52b and rear connecting bend 73 to the intermediate loop 52a. In this manner a single path of flow for liquid refrigerant is provided through the two groups of U-shaped loops 52a and 52b.

In Fig. 10 the sections 56a, 57a and 58a of shell 50a are generally like those in the embodiment described above and further include ribs 64b in addition to the ribs 64a at the side walls 61a. The sections 57a and 58a are formed with the ribs 64a extending horizontally inward in a manner similar to the ribs 64 in Fig. 8, and the ribs 64b extending horizontally outward toward the side walls 61a. After the shell and looped coil are assembled without interference by the connecting bends, the ribs 64a and 64b are bent upward from the horizontal plane about the straight portions of the loops. The modification in Fig. 10 is generally like that shown in Figs. 2 to 9 inclusive and further description thereof will not be made here.

By forming the looped coil 51 and the sections of housing 50 in the manner described above, the assembly of the cooling unit 14 is readily effected. Further, the fabrication of a cooling unit in the manner herein disclosed lends itself to the use of evaporator sections which may be formed by extrusion. The looped coil 51 is preferably formed of steel and the sections of shell 50 preferably formed of a metal, such as aluminum, for example, which possesses high thermal conductive properties. When the sections of shell 50 are formed by extruding aluminum through suitable dies, for example, the ribs 64 are formed in the manner shown in Fig. 8. After the sections are cut off into the proper length, the ribs are notched at 74, as shown most clearly in Fig. 5. The portions 64' of the ribs which extend from the notches 74 to the forward end of the shell 50 underlie the closed ends 53 of the U-shaped loops 52 and are not bent, as shown most clearly in Figs. 5 and 6. Only the portions of the ribs 64 extending rearwardly from the notches 74 are bent, such bent portions being wrapped around the straight portions 54 of the U-shaped loops 52 in the manner described above.

Figures 11, 12:
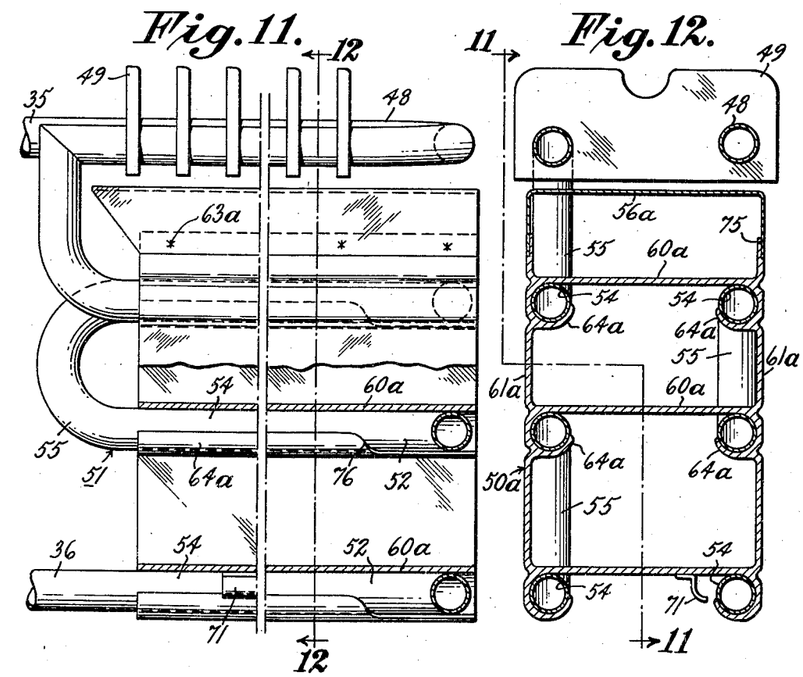
Fig. 11 is a side elevation, partly in section and taken on line 11—11 of Fig. 12, illustrating another modification of the invention.
Fig. 12 is a vertical sectional view taken on line 12—12 of Fig. 11.
Figure 13:
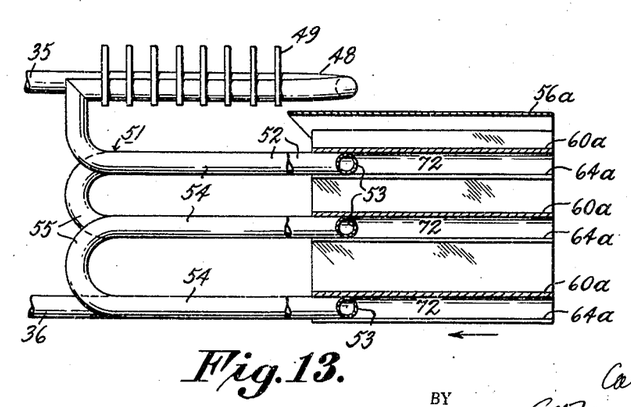
Fig. 13 is a side elevation illustrating more clearly the manner in which the looped coil and shell of the cooling unit shown in Figs. 11 and 12 are assembled.

Figs. 11 to 13 inclusive illustrate another modification of the invention in which the side walls 61a and shelves 60a making up the shell or housing 50a are formed as an integral unit rather than a plurality of sections. The looped coil formed from pipe or conduit 51 is similar to that shown in Figs. 3 to 7 inclusive and described above. The upper edges of the side walls 61a are recessed at 75 to form shoulders which receive the side walls of an inverted U-shaped plate 56a that forms the top of the shell. The sides of U-plate 56a are spot welded at 63a to the side walls 61a, as shown in Fig. 11.

In fabricating the cooling unit shown in Figs. 11 to 13 inclusive, the shell 50a and looped coil are readily assembled in a manner similar to the embodiments described above. As shown in Fig. 13, the looped coil may be formed with the cooling fins 49 fixed to the uppermost loop 48. The looped coil and shell 50a are placed in alignment with the rear of the shell adjacent to the front connecting bends 53 of the horizontal loops 52. The shell 50a and looped coil are then moved relatively to each other with the grooves or channels 72 formed by the shelves 60a and ribs 64a receiving the straight portions 54 of the loops 52. This manner of assembling the shell 50a and looped coil is clearly shown in Fig. 13 with the front ends of the loops partly received by the grooves or channels 72. In this modification, as in the previous embodiments, the shell and looped coil can be assembled by telescoping these parts together without any interference by the connecting bends of the looped coil.

After the shell 50a is moved rearwardly onto the looped coil to the position shown in Fig. 11, the ribs 64a are bent about the straight portions 54 with a suitable tool. While in the embodiment previously described the ribs are formed with notches 72 before the shell and looped coil are assembled, as shown in Fig. 5, the notches are omitted in the present modification whereby flaring of the ribs 64a is produced at 76 at the region where the ribs turn from a horizontal position to the curved or bent position at the forward ends of the straight portions 54 of the loops, as shown most clearly in Fig. 11. As in the embodiments previously described, the forward horizontal portions of the ribs underlie the front connecting bends 53 of the horizontal loops 52.

A further modification of the invention is shown in Figs. 14 to 17 inclusive. In this modification the looped coil is formed to provide an S-shaped uppermost loop 48b having an inlet end 77 which is connected to conduit 35 through which gas rich in refrigerant leaves the evaporator or cooling unit 14'. The uppermost S-shaped loop is provided with cooling fins 49b. As shown most clearly in Fig. 16 the rich gas enters the uppermost loop 48b at 78 through a vertical connecting bend 79 from the uppermost U-shaped loop 80 which is in heat exchange relation with shell 50b. In this modification the vertical connecting bends 79 are at the front of cooling unit 14' and the horizontal bends 81 connecting the straight portions 82 are at the rear of the cooling unit. With the front baffle plate 67 removed, therefore, the vertical connecting bends 79 may be seen at the front of the cooling unit 14'.

The shell 50b comprises a plurality of sections including a top section 83, intermediate sections 84 and a bottom section 85. The intermediate sections 84 are H-shaped, as shown most clearly in Fig. 15, the integrally formed horizontal portions and spaced vertical portions thereof constituting the shelves 86 and parts of the side walls 87 of the shell 50b. The bottom section 85 is U-shaped to form the bottom 88 of the shell 50b and the lower parts of the side walls 87. The intermediate sections 84 and bottom section 85 are notched or recessed along their edges at 89 so that these sections and the top section 83 interfit to provide the shell 50b having smooth exterior surfaces. The sections 83, 84 and 85 are secured together in any suitable manner, as by spot welding indicated at 90 in Fig. 16.

The straight portions 82 of the loops 80 are secured in position against the upper sides of the shelves. In this modification, therefore, the ribs 91 are above the shelves 86 and the bottom 88 and spaced therefrom a distance substantially the same as the outer diameter of the pipe or conduit. The ribs are bent downwardly and wrap about the straight portions 82 of the loops 80. As shown most clearly in Fig. 16, the ribs 91 terminate at a region to the rear of the front vertical connecting bends 79.

The method of fabricating the cooling unit in Figs. 14 to 17 inclusive is generally like that described above in connection with the other embodiments. After the sections 84 and 85 are formed, as by extrusion, for example, the ribs 91 are cut off at the forward ends to provide clearance for the front vertical connecting bends 79. The sections 83, 84 and 85 are then secured together, as by spot welding at 90, to form the housing 50b. Since the vertical connecting bends 79 are at the front of the cooling unit 14b, the looped coil and shell 50b are assembled in this modification by placing the front of the shell 50b in alignment with the rear horizontal bends 81 of the looped coil, and the shell 50b and looped coil are then moved relatively to each other. This is clearly shown in Fig. 17 in which the shell 50b has been moved part way onto the looped coil toward the front vertical connecting bends 79. After the looped coil and the shell 50b are in the position shown in Fig. 16, the ribs 91 are bent downwardly with a suitable tool about the straight portions 82 of the looped coil. In this modification, as in the embodiments described above, the looped coil and shell 50b can be readily assembled without interference by the connecting bends of the looped coil.

Figure 14:
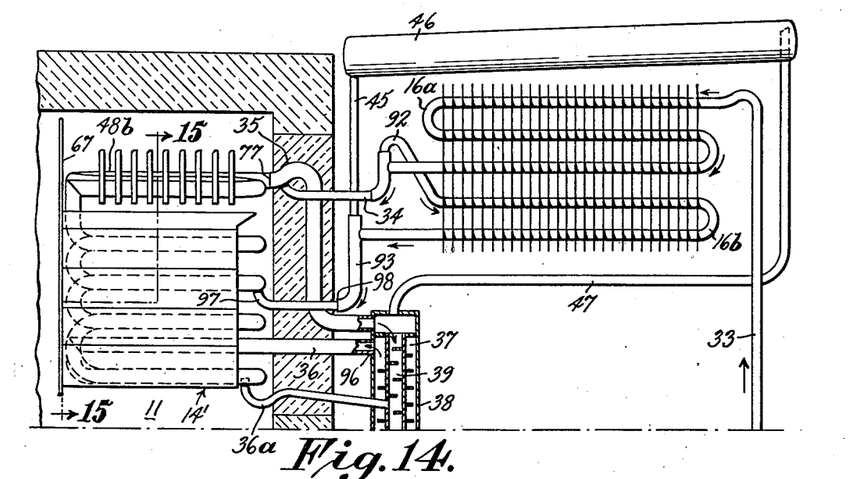
Fig. 14 is a fragmentary view illustrating more or less diagrammatically a modification of the refrigeration system shown in Fig. 2 and embodying a further modification of the invention.

In a cooling unit of the character shown in Figs. 14 to 17 inclusive it may be desirable to conduct liquid refrigerant into an intermediate part of the looped coil as well as the upper end thereof. In such case the condenser may be formed to provide an upper section 16a and a lower section 16b, as shown in Fig. 14. The refrigeration system generally may be like that shown in Fig. 2 and described above, and only a portion of the system has been shown in Fig. 14 with parts similar to those illustrated in Fig. 2 being referred to by the same reference numerals.

In Fig. 14 refrigerant vapor flows from the generator through conduit 33 into upper condenser section 16a in which it is liquefied. Liquid refrigerant flows from the upper condenser section 16a through conduits 34 and 35 into the inlet 77 of the uppermost S-shaped loop 48b. Refrigerant vapor flowing from upper condenser section 16a is conducted through conduit 92 into the lower condenser section 16b in which it is liquefied. Liquid refrigerant flows from lower condenser section 16b through conduits 93 and 97 into an intermediate part of the cooling unit 14'. A drain conduit 36a is connected to the lower end of evaporator 14' to allow unevaporated refrigerant to flow into the inner passage 39 of gas heat exchanger 38.

In fabricating the cooling unit 14' the looped coil is formed in such a manner that, when the fabrication of the cooling unit is completed, it is only necessary to make the necessary connections to other parts of the refrigeration system. As shown most clearly in Fig. 14, the cooling unit when completed is connected at the inlet at 77 to conduit 35 and at 96 to gas heat exchanger 38. Also, the drain conduit 36a is connected at its lower end to gas heat exchanger 38 and conduit 97 is connected at 98 to conduit 93. As shown most clearly in Figs. 15 and 16, it will be seen that the horizontal connecting bends 81 are disposed above the shelves 86. Hence the connection of conduits 36a and 97 must be made to the looped coil after the looped coil and shell 50b are assembled. In order to avoid making the connections of conduits 36a and 97 to the looped coil after the fabrication of the cooling unit 14' is completed, the shell 50b and looped coil may be assembled in the manner shown in Fig. 18.

Figure 15:
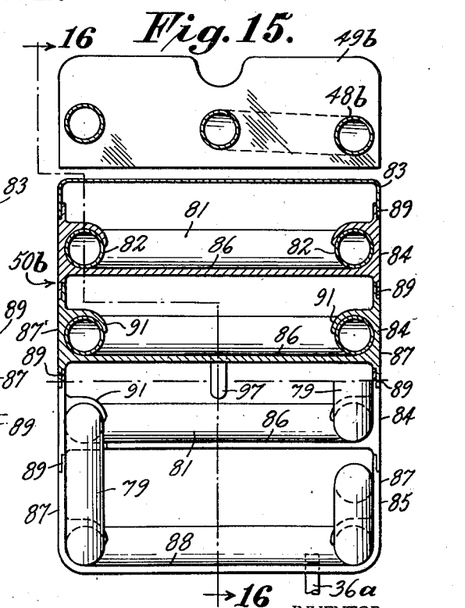
Fig. 15 is a front elevation, partly in section, taken on line 15—15 of Fig. 14.
Figure 16:
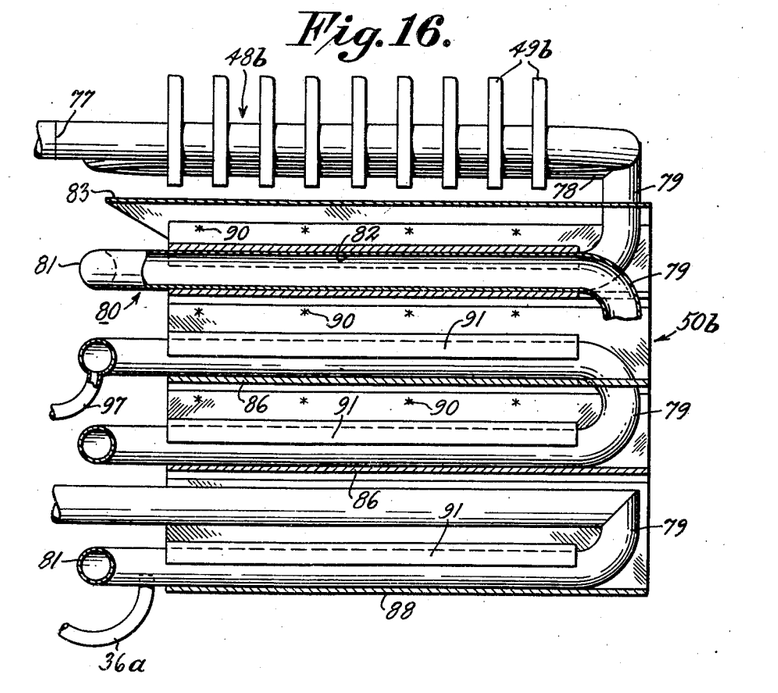
Fig. 16 is a side elevation, partly in section, taken on line 16—16 of Fig. 15.
Figure 17:
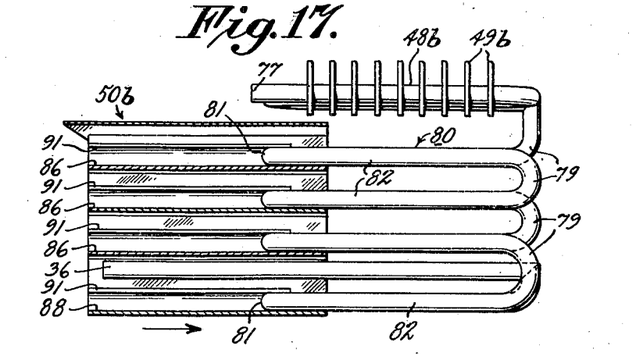
Fig. 17 is a side elevation similar to Fig. 13 and illustrating more clearly the manner in which the shell and looped coil in Figs. 14 to 16 are assembled.
Figure 18:
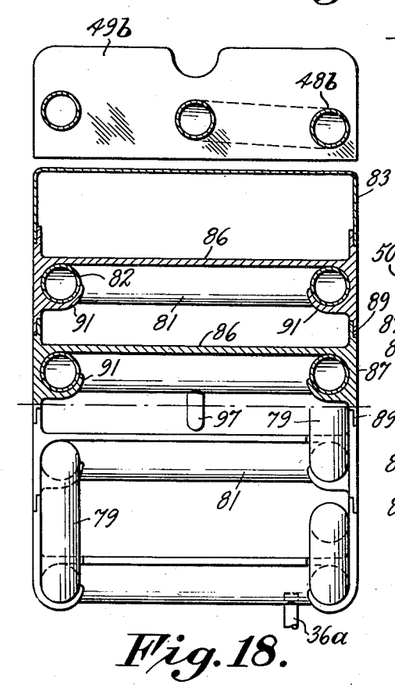
Fig. 18 is a front elevation similar to Fig. 15 illustrating a still further modification of the invention.

In the modification shown in Fig. 18, the straight portions 82 of the loops are disposed below the shelves 86 instead of above the shelves, as shown in Fig. 15. With this arrangement the conduits 36a and 97 can be connected to the looped coil before the latter and the shell 50b are assembled. After the looped coil and shell 50b in Fig. 18 are assembled, it is only necessary to make the connections of the looped coil at 77 and 96 to conduit 35 and gas heat exchanger 38, to connect conduit 97 at 98 to conduit 93, and to connect the lower end of drain conduit 36a to gas heat exchanger 38.

By making the shelves of the cooling units integral with the side walls of the shell and forming the ribs in the manner shown in the different embodiments, a good thermal conductive path is provided for transfer of heat from the shelves to liquid refrigerant flowing in the looped coil. With integrally formed side walls and shelves, the sections of the cooling unit are essentially H-shaped when a number of sections are employed to make up the cooling unit. The H-shaped section is particularly advantageous because in assembly line manufacture the individual loops of the looped shaped coil may not always be exactly in alignment. In such case, the H-shaped sections possess sufficient strength to bring the individual loops into alignment when the shell and looped coil are assembled. Further, after the shell and looped coil are assembled, any slight irregularities in alignment are not of serious consequence because in bending the ribs about the straight portions of the loops, good thermal contact is effected between the straight portions of the looped coil and shell. This is particularly true when the looped coil is formed from a relatively hard metal such as steel and the shell is formed of a metal, such as aluminum, for example. When the shell is formed in one piece, further advantages result in the fabrication of the cooling unit inasmuch as the necessity of welding several H-shaped sections together is avoided. The arrangement when the shell is formed of one piece is still essentially a plurality of H-shaped sections which are intergrally united together. A further characteristic of the H-shaped form is that solid shelves are provided whereby flat and smooth surfaces are insured for supporting shallow trays for freezing water and the like.

While several embodiments of the invention have been shown and described, such variations and modification are contemplated as fall within the true spirit and scope of the invention, as pointed out in the following claims.

What is claimed is:

1. A cooling unit or evaporator including a shell provided with a shelf and a looped coil or conduit in thermal exchange therewith, said shell having ribs thereon disposed above said shelf and spaced therefrom substantially the diameter of said conduit to provide channels, said channels being located and said looped coil being formed so that said shell and said coil can be slidingly moved together, with the channels receiving portions of said looped coil during such relative sliding movement without interference by the connecting bends of said looped coil.

2. A cooling unit or evaporator including a shell provided with a shelf and a looped coil or conduit in thermal exchange therewith, said shell having ribs thereon disposed below said shelf and spaced therefrom substantially the diameter of said conduit to provide channels, said channels being located and said looped coil being formed so that said shell and said coil can be slidingly moved together, with the channels receiving portions of said looped coil during such relative sliding movement without interference by the connecting bends of said looped coil.

3. A cooling unit or evaporator comprising a shell providing a freezing enclosure in which ice and the like may be produced and having sidewalls and a plurality of shelf walls extending between said sidewalls, the major portion of each of said shelf walls providing a smooth supporting surface, ribs formed integrally with said shelf walls at regions adjacent to and inside said sidewalls, said ribs being arranged to provide grooves or channels extending from the front to the rear of said shell, and a looped coil having a plurality of loops disposed one above the other, said loops having straight portions in said channels adjacent to said sidewalls, said channels being formed with spaced apart sides adapted to embrace at least half of the circumference of the straight portions of said loops, each of said ribs, serving as one of said spaced apart sides, being bent about said straight portions.

4. A cooling unit or evaporator comprising a shell providing a freezing enclosure in which ice and the like may be produced, said shell having side walls and shelf walls extending between said sidewalls, ribs formed integrally with said shelf walls at regions adjacent to said sidewalls to provide channels, a looped coil having horizontal U-shaped loops disposed one above the other with the closed ends at the front of said shell and straight portions extending rearwardly therefrom, vertical bends at the rear of said straight portions to connect said loops, the straight portions of said loops being disposed in said channels adjacent to said sidewalls, and said ribs being bent about said straight portions.

5. A cooling unit or evaporator comprising a coil including a plurality of loops having straight portions and bends connecting the straight portions; a shell having sidewalls and one or more shelves extending between the sidewalls; ribs on said shell arranged to form grooves or channels extending from the front to the rear thereof to receive the straight portions of said loops; and said looped coil being formed and said channels being located so that said shell and said looped coil can be placed end to end and in alignment and moved toward each other, with said channels always receiving the straight portions of said loops during such relative movement while said channels and straight portions are in overlapping relation, without interference by the connecting bends.

6. A cooling unit or evaporator comprising a shell providing a freezing enclosure in which ice and the like may be produced; said shell including a top, bottom, spaced vertical walls, and a shelf wall within said enclosure; the major portion of said shelf wall providing a smooth supporting surface; portions of said vertical walls and said shelf wall being integrally united to form an essentially H-shaped member with said vertical wall portions having parts extending above and below the shelf wall associated therewith; said member being provided with ribs formed integrally with said shelf wall at regions adjacent to said vertical walls; and a looped coil provided with straight portions held in thermal exchange relation with said shelf wall by said ribs at regions adjacent to said vertical walls and within the enclosure.

7. A cooling unit or evaporator comprising a coil including substantially parallel straight portions, horizontal connecting bends at the front of said straight portions, and vertical connecting bends at the rear of said straight portions, said substantially parallel straight portions and horizontal connecting bends forming horizontal loops disposed one above the other, a shell having spaced sidewalls and shelves therebetween, ribs on said shell at regions adjacent to and inside said sidewalls, said ribs providing channels extending from the front to the rear of said shell to receive the straight portions of said loops, and said coil being formed and said channels being located on said shell so that said shell and coil can be placed in alignment with the rear of said shell adjacent to the front of said horizontal loops and said shell and said coil moved toward each other, whereby said channels will always receive said straight portions during such relative movement without interference by the connecting bends of said coil.

8. A cooling unit or evaporator comprising a coil including substantially parallel straight portions, horizontal connecting bends at the rear of said straight portions, and vertical connecting bends at the front of said straight portions, said substantially parallel straight portions and horizontal connecting bends forming horizontal loops disposed one above the other, a shell having spaced sidewalls and shelves therebetween, ribs on said shell at regions adjacent to and inside said sidewalls, said ribs providing channels extending from the front to the rear of said shell to receive the straight portions of said loops, and said coil being formed and said channels being located on said shell so that said shell and coil can be placed in alignment with the front of said shell adjacent to the rear of said horizontal loops and said shell and said coil moved toward each other, whereby said channels will always receive said straight portions during such relative movement without interference by the connecting bends of said coil.

9. That improvement in the method of fabricating a cooling unit or an evaporator having a looped coil or conduit in thermal exchange relation with a shell, which consists in providing ribs on the shell to form channels which are so located that the looped coil and shell can be placed in alignment and slidably moved together, with the channels always receiving portions of said looped coil during such relative sliding movement and while said channels and coil are in overlapping relation, without interference by the connecting bends of the looped coil.

10. A cooling unit or evaporator including a shell and a looped coil or conduit in thermal exchange relation therewith, said shell having ribs thereon to provide channels, said channels being located and said looped coil being formed so that said coil and said shell can be placed in alignment and slidingly moved together, with the channels always receiving portions of the looped coil during such relative sliding movement while said channels and coil are in overlapping relation, without interference by the connecting bends of said looped coil.

11. A cooling unit or evaporator including a shell provided with a shelf and a looped coil or conduit in thermal exchange relation therewith, said shell having ribs thereon cooperating with said shelf to provide channels, said channels being located and said looped coil being formed so that said coil and said shell can be placed in alignment and slidingly moved together, with the channels always receiving portions of said looped coil during such relative sliding movement while said channels and coil are in overlapping relation, without interference by the connecting bends of said looped coil.

12. A cooling unit or evaporator comprising a shell providing an enclosure in which ice and the like may be produced and having side walls and shelf walls extending between said side walls, the major portion of each of said shelf walls providing a smooth supporting surface, said shell being formed of at least two sections each having integrally formed parts serving at least a portion of one of said shelf walls and also a portion of said side walls, ribs formed integrally with said shelf walls at regions adjacent to and inside said side walls, said ribs being arranged to provide grooves or channels extending from the front to the rear of said shell, and a looped coil having a plurality of loops disposed one above the other, said loops having straight portions in said channels adjacent to said side walls, said channels being formed with spaced apart sides adapted to embrace at least half of the circumference of the straight portions of said loops, each of said ribs, serving as one of said spaced apart sides, being bent about said straight portions.

13. A cooling unit or evaporator comprising a shell providing a freezing enclosure in which ice and the like may be produced and having spaced apart side walls and a plurality of horizontal parts between said side walls, the major portion of each of said horizontal parts providing a smooth supporting surface, ribs formed integrally with said horizontal parts at regions adjacent to said side walls, said ribs being disposed within said shell to provide a cooling unit having substantially smooth exterior surfaces, said ribs being arranged to cooperate individually with portions of said horizontal parts to form grooves or channels extending from the front to the rear of said shell, and a looped coil having a plurality of loops disposed one above the other, said loops having spaced apart arms or straight portions, said channels being located adjacent to said side walls and having spaced apart sides adapted to embrace the straight portions of said loops, each of said ribs, serving as one of said spaced apart sides, being bent about said straight portions.

CARL T. ASHBY.